United States Patent
Nordland et al.

(10) Patent No.: US 8,613,368 B2
(45) Date of Patent: Dec. 24, 2013

(54) CONTAINERS WITH OPTIONAL VENTING

(75) Inventors: Kate E. Nordland, Rochester, NY (US); Scott A. Hanson, Grayslake, IL (US); Raj K. Mangla, Rochester, NY (US); Terry W. Cratsley, Honeoye, NY (US)

(73) Assignee: Pactiv LLC., Lake Forest, IL (US)

( * ) Notice: Subject to any disclaimer, the term of this patent is extended or adjusted under 35 U.S.C. 154(b) by 0 days.

(21) Appl. No.: 13/349,395

(22) Filed: Jan. 12, 2012

(65) Prior Publication Data
US 2012/0111759 A1 May 10, 2012

Related U.S. Application Data

(63) Continuation of application No. 11/508,135, filed on Aug. 21, 2006, now abandoned, which is a continuation of application No. 10/613,827, filed on Jul. 3, 2003, now abandoned.

(51) Int. Cl.
*B65D 51/16* (2006.01)
*B65D 43/16* (2006.01)

(52) U.S. Cl.
USPC ........ 220/367.1; 220/266; 220/839; 220/4.23

(58) Field of Classification Search
USPC ............. 220/367.1, 4.23, 839, 712–714, 265, 220/266; 119/73
See application file for complete search history.

(56) References Cited

U.S. PATENT DOCUMENTS

| 1,926,240 | A | 9/1933 | Maas |
| 3,061,139 | A | 10/1962 | Edwards |
| 3,326,408 | A | 6/1967 | Ringlen |
| 3,511,288 | A | 5/1970 | Swett et al. |
| D220,749 | S | 5/1971 | Artc |
| 3,620,411 | A * | 11/1971 | Rump .......................... 220/315 |
| 3,690,902 | A | 9/1972 | Dahl |
| 3,815,736 | A | 6/1974 | Sedlak |
| 3,848,795 | A | 11/1974 | Bird et al. |
| 3,851,789 | A | 12/1974 | Case et al. |
| 3,927,794 | A | 12/1975 | Erdman |
| 3,955,710 | A | 5/1976 | Commisso |
| RE29,415 | E | 9/1977 | Ricobene et al. |
| 4,132,344 | A | 1/1979 | Jewell |
| D254,776 | S | 4/1980 | Edwards |
| 4,210,674 | A | 7/1980 | Mitchell |
| 4,234,097 | A | 11/1980 | Daenen |
| 4,253,600 | A | 3/1981 | Schubert |

(Continued)

FOREIGN PATENT DOCUMENTS

| GB | 1602694 | 11/1981 |
| JP | 060-84519 A | 3/1994 |

OTHER PUBLICATIONS

U.S. Appl. No. 10/613,827, filed Jul. 3, 2003, (Abandoned).
U.S. Appl. No. 10/613,827, Dec. 13, 2006 Notice of Abandonment.

(Continued)

*Primary Examiner* — Anthony Stashick
*Assistant Examiner* — James N Smalley
(74) *Attorney, Agent, or Firm* — Baker Botts L.L.P.

(57) ABSTRACT

An optional venting container comprises a base and a lid. The lid is releasably latched to the base. The lid comprises at least one veritable area formed therein. The at least one veritable area is adapted to form a vent only upon a user asserting pressure thereon. The lid is made from a polymeric foam.

23 Claims, 2 Drawing Sheets

(56) References Cited

U.S. PATENT DOCUMENTS

| | | | |
|---|---|---|---|
| D259,543 S | 6/1981 | Commisso et al. | |
| D263,798 S | 4/1982 | Edwards | |
| 4,375,862 A | 3/1983 | Kurinsky et al. | |
| D276,216 S | 11/1984 | Michaud | |
| 4,530,440 A | 7/1985 | Leong | |
| 4,535,889 A | 8/1985 | Terauds | |
| 4,576,330 A | 3/1986 | Schepp | |
| 4,602,719 A | 7/1986 | Borst | |
| 4,627,550 A | 12/1986 | Dines | |
| 4,687,117 A | 8/1987 | Terauds | |
| 4,721,210 A | 1/1988 | Lawrence et al. | |
| 4,741,452 A | 5/1988 | Holzkopf | |
| 4,744,332 A * | 5/1988 | Ahrens | 119/73 |
| 4,753,351 A | 6/1988 | Guillin | |
| RE32,739 E | 8/1988 | Terauds | |
| 4,848,543 A | 7/1989 | Doboze | |
| 4,882,463 A | 11/1989 | Kyougoku et al. | |
| 4,883,195 A | 11/1989 | Ott et al. | |
| 4,898,299 A | 2/1990 | Herbst et al. | |
| 4,974,738 A | 12/1990 | Kidd et al. | |
| 4,976,370 A | 12/1990 | Cassel | |
| 4,989,748 A | 2/1991 | Parr et al. | |
| 5,046,659 A | 9/1991 | Warburton | |
| 5,076,459 A | 12/1991 | DeHart | |
| 5,114,766 A | 5/1992 | Jacques | |
| 5,131,551 A | 7/1992 | Wells | |
| 5,224,623 A | 7/1993 | LaFleur | |
| D341,316 S | 11/1993 | Fritz et al. | |
| D343,576 S | 1/1994 | Krupa | |
| 5,322,182 A | 6/1994 | Fritz | |
| D352,000 S | 11/1994 | Hansen et al. | |
| D353,327 S | 12/1994 | Castner et al. | |
| 5,377,860 A | 1/1995 | Littlejohn et al. | |
| 5,423,453 A | 6/1995 | Fritz | |
| D361,035 S | 8/1995 | Krupa | |
| D361,036 S | 8/1995 | Krupa | |
| 5,456,379 A | 10/1995 | Krupa et al. | |
| D363,879 S | 11/1995 | Krupa et al. | |
| 5,471,718 A | 12/1995 | Harrill | |
| 5,474,728 A | 12/1995 | Castner et al. | |
| 5,509,568 A | 4/1996 | Warden et al. | |
| D374,376 S | 10/1996 | Goins et al. | |
| 5,595,769 A | 1/1997 | Castner et al. | |
| 5,607,709 A | 3/1997 | Fritz et al. | |
| 5,613,619 A | 3/1997 | Van Melle | |
| D382,796 S | 8/1997 | Mangla | |
| 5,678,725 A * | 10/1997 | Yamada et al. | 220/592.21 |
| D386,081 S | 11/1997 | Hayes et al. | |
| 5,693,388 A | 12/1997 | Castner et al. | |
| 5,906,292 A | 5/1999 | Rider | |
| 5,944,211 A | 8/1999 | Woodnorth et al. | |
| 5,947,321 A | 9/1999 | Vadney | |
| 6,223,501 B1 | 5/2001 | Ringer | |
| 6,244,066 B1 * | 6/2001 | LaRose | 62/457.7 |
| 6,257,434 B1 | 7/2001 | Lizzio | |
| 6,286,702 B1 | 9/2001 | Buermann | |
| 6,786,351 B2 | 9/2004 | Krueger | |
| 2008/0042311 A1 | 2/2008 | Nordland et al. | |

OTHER PUBLICATIONS

U.S. Appl. No. 10/613,827, Sep. 11, 2006 Advisory Action.
U.S. Appl. No. 10/613,827, Aug. 21, 2006 Response to Final Office Action.
U.S. Appl. No. 10/613,827, Apr. 19, 2006 Final Office Action.
U.S. Appl. No. 10/613,827, Jan. 25, 2006 Response to Non-Final Office Action.
U.S. Appl. No. 10/613,827, Aug. 25, 2005 Non-Final Office Action.
U.S. Appl. No. 10/613,827, Aug. 4, 2005 Amendment and Request for Continued Examination (RCE).
U.S. Appl. No. 10/613,827, Jun. 22, 2005 Advisory Action.
U.S. Appl. No. 10/613,827, Jun. 6, 2005 Response to Final Office Action.
U.S. Appl. No. 10/613,827, Mar. 4, 2005 Final Office Action.
U.S. Appl. No. 10/613,827, Jan. 3, 2005 Response to Non-Final Office Action.
U.S. Appl. No. 10/613,827, Oct. 5, 2004 Non-Final Office Action.
U.S. Appl. No. 11/508,135, Oct. 18, 2011 Final Office Action.
U.S. Appl. No. 11/508,135, Jun. 30, 2011 Response to Non-Final Office Action.
U.S. Appl. No. 11/508,135, Apr. 1, 2011 Non-Final Office Action.
U.S. Appl. No. 11/508,135, Dec. 15, 2009 Amendment and Request for Continued Examination (RCE).
U.S. Appl. No. 11/508,135, Dec. 10, 2009 Advisory Action.
U.S. Appl. No. 11/508,135, Oct. 15, 2009 Response to Final Office Action.
U.S. Appl. No. 11/508,135, Jul. 15, 2009 Final Office Action.
U.S. Appl. No. 11/508,135, Mar. 23, 2009 Response to Non-Final Office Action.
U.S. Appl. No. 11/508,135, Dec. 29, 2008 Non-Final Office Action.
Description of Prior Art Fig. 1 and Fig. 2—U.S. Patent No. 5,947,321 (date prior to 1998).
FIGs. 1A-1D Drawings of 47097-01251 (showing top view of a lid, top view of a base, side view of the lid detached from the base, and partial cross-section of the lid detached from the base respectively); Manufacturer: Unknown; (date prior to 1998).
Description of FIGs. 1A-1D—47097.01251 (dated prior to 1998).

* cited by examiner

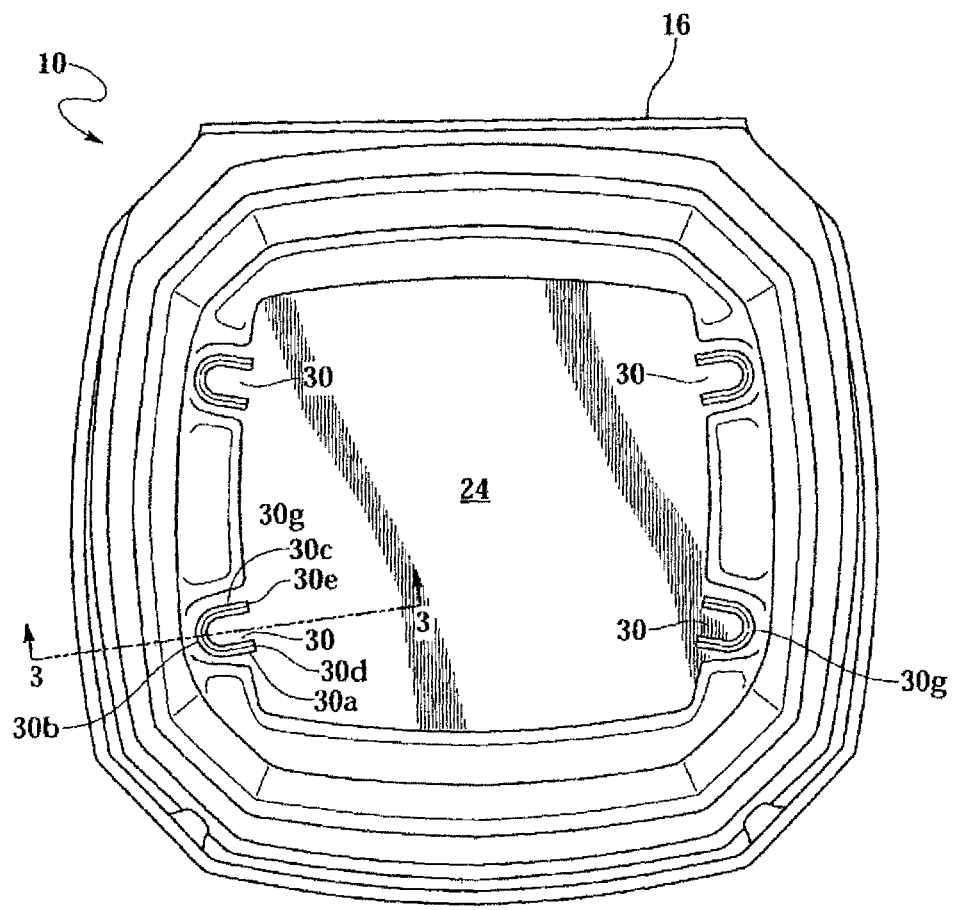
*Fig.2*
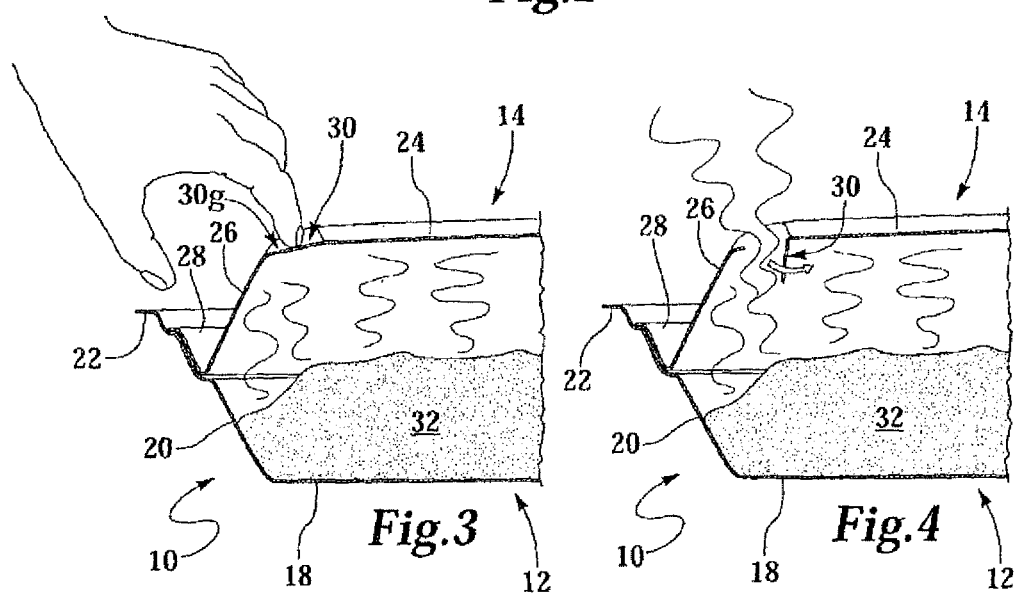
*Fig.3*  *Fig.4*

CONTAINERS WITH OPTIONAL VENTING

CROSS REFERENCES TO RELATED APPLICATIONS

This application is a continuation of U.S. Non-Provisional patent application Ser. No. 11/508,135, filed Aug. 21, 2006, now abandoned, which is a continuation of U.S. Non-Provisional application Ser. No. 10/613,827, filed Jul. 3, 2003, now abandoned, the disclosure of which are incorporated herein in their entirety.

FIELD OF INVENTION

The present invention relates generally to the packaging industry. More particularly, the present invention relates to polymeric foam containers with optional venting.

BACKGROUND OF THE INVENTION

The use of inexpensive polymeric foam containers, such as foamed alkenyl aromatic polymeric containers, has become popular, especially for preparing and serving various food products. These containers generally have been used for heating and storing the food product(s) disposed therein. These containers typically comprise a cover or lid and a base.

One disadvantage of existing containers is the lack of flexibility on venting given to the end users of these containers. Some food needs to be vented in a closed container, while other foods do not need venting in a closed container. For example, some fried foods tend to get soggy if the generated steam cannot exit the container, while other foods will lose heat quickly if the container has vents.

The lack of flexibility in existing containers often results in store owners purchasing both vented and non-vented polymeric foam containers. Alternatively, the store owners may be forced to vent the container by ripping or puncturing it. Such ripping or puncturing often will result in a container that is not aesthetically pleasing to the end user.

A need therefore exists for a polymeric foam container to have more flexibility and versatility in venting for the end user.

SUMMARY OF THE INVENTION

According to one embodiment, an optional venting container comprises a base and a lid. The lid is releasably latched to the base. The lid comprises at least one ventable area formed therein. The at least one veritable area is adapted to form a vent only upon a user asserting pressure thereon. The lid is made from a polymeric foam.

According to another embodiment, an optional venting container comprises a base and a lid. The lid is releasably latched to the base. The lid comprises at least one ventable area formed therein. The at least one ventable area is adapted to form a vent only upon a user asserting pressure thereon. The at least one ventable area is formed by a perforation cut. The lid is made from a polymeric foam.

According to a further embodiment, an optional venting polymeric foam container comprises a base, a lid, and a hinge. The lid is releasably latched to the base. The lid comprises at least one ventable area formed therein. The at least one ventable area is adapted to form a vent only upon a user asserting pressure thereon. The at least one ventable area is formed by a perforation cut. The hinge connects the base and the lid and allows the lid to pivot with respect to the base. The base and the lid are made from the same polymeric foam.

According to one method, a polymeric foam container is formed by providing a foamable resin in an extruder. The foamable resin is melted in the extruder and then is extruded from the extruder to form an extruded material. The extruded material is thermoformed into a container comprising a base and a lid. The lid is releasably latched to the base. The lid comprises at least one ventable area formed therein. The at least one ventable area is adapted to form a vent only upon a user asserting pressure thereon.

According to yet another embodiment, a polymeric foam lid, which is adapted to be releasably latched to a base, comprises at least one ventable area formed therein. The at least one ventable area is adapted to form a vent only upon a user asserting pressure thereon. The lid is made from a polymeric foam.

According to another method, a polymeric foam lid, which is adapted to be releasably latched to a base, is formed by providing a foamable resin in an extruder. The foamable resin is melted in the extruder. The foamable resin is extruded from the extruder to form an extruded material. The extruded material is thermoformed into a lid. The lid comprises at least one ventable area formed therein. The at least one ventable area is adapted to form a vent only upon a user asserting pressure thereon.

BRIEF DESCRIPTION OF THE DRAWINGS

Other advantages of the invention will become apparent on reading the following detailed description and on reference to the drawings.

FIG. 2 is a top view of the container of FIG. 1;

FIG. 3 is a cross-sectional view taken generally along the line 3-3 of FIG. 2 in a closed position; and FIG. 4 is a cross-sectional view taken generally along the line 3-3 of FIG. 2 in a vented position.

Figure 1:
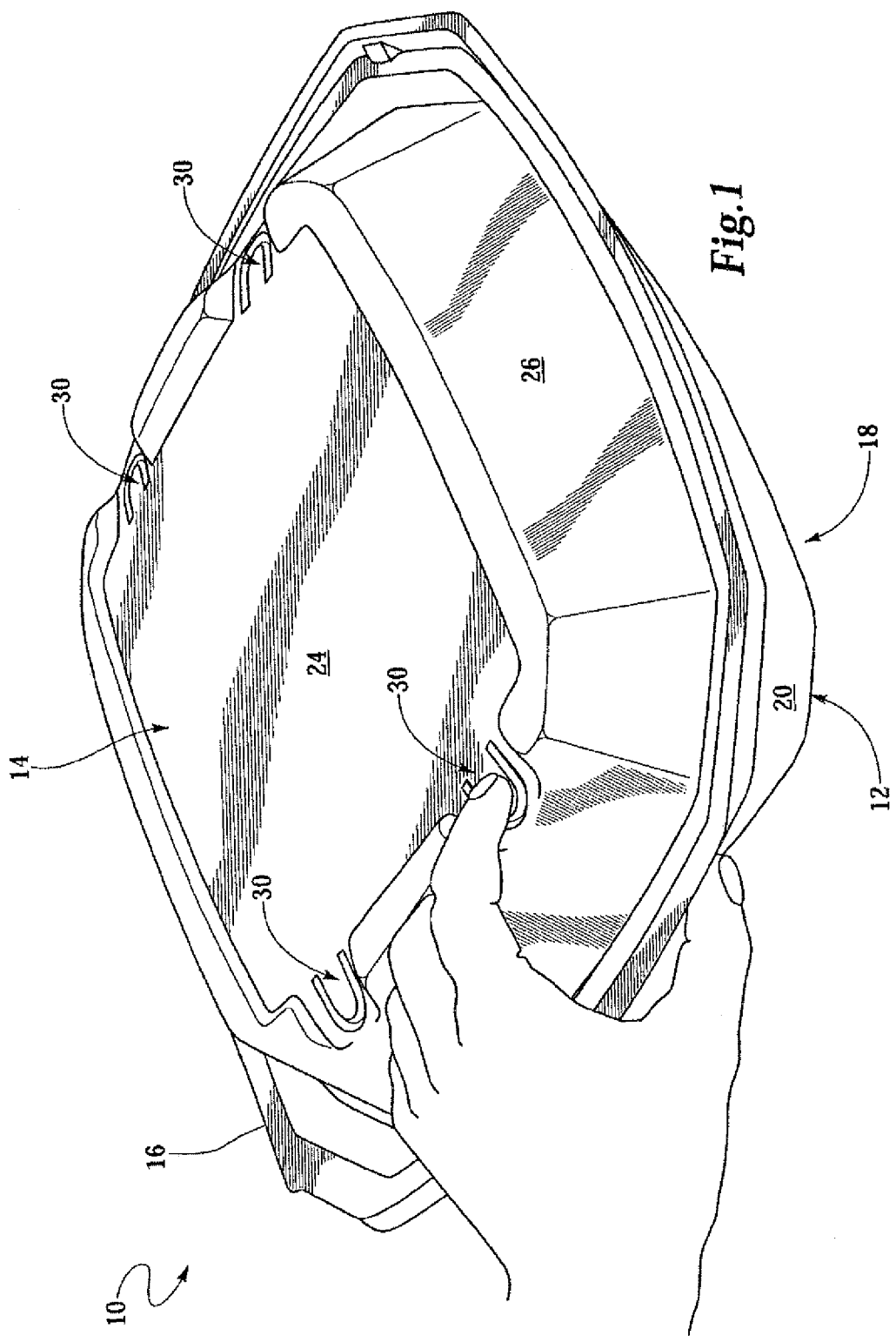
FIG. 1 is a perspective view of a container according to one embodiment of the present invention.

While the invention is susceptible to various modifications and alternative forms, a specific embodiment thereof has been shown by way of example in the drawing and will herein be described in detail. It should be understood, however, that it is not intended to limit the invention to the particular form disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Referring to FIGS. 1-4, a container 10 according to one embodiment of the present invention is depicted. The height and shape of the container may vary from that shown without departing from the scope of the invention. For example, the container 10 is shown as being generally rectangular or square, but it is contemplated that shapes like oval, circular, and other polygonal and non-polygonal shapes may be used.

The container of the present invention is typically used to hold food. The container may be used for serving, storing, preparing and/or re-heating the food such as pre-packed meals. The container of the present invention desirably has insulating properties to assist in maintaining the temperature of any food contained therein. One example of such a container is an alkenyl aromatic polymeric foam container.

The container 10 of FIGS. 1-4 includes a base 12, a lid 14 and a hinge 16. The hinge 16 connects the base 12 and the lid 14 and enables the lid to rotate relative to the base so as to open and close the container 10. The lid 14 is adapted to releasably engage the base 12. According to another embodiment, the base and the lid may be formed from separate pieces without using a hinge. In this embodiment, the lid is also adapted to releasably engage the base.

The base 12 comprises a bottom 18 and a sidewall 20 that encompasses and projects upwardly and outwardly from the bottom 18. It is contemplated that the sidewall may project only upwardly from the bottom. The bottom and/or sidewall may include ribs for additional carrying strength. It is contemplated that the base may be a generally flat surface that is adapted to releasably engage the lid. In such an embodiment, the base would not include a sidewall extending upwardly therefrom.

The base 12 may further include an optional rim (e.g., continuous rim 22 in FIGS. 3 and 4) that encompasses and projects laterally outwardly from the sidewall 20. The optional rim may be discontinuous, although, if used, it is preferred to be continuous. The rim is advantageous for a number of reasons including providing supporting strength when the container is being placed in the closed position. Additionally, the process of making the container, such as by thermoforming, is made easier by using a rim. Alternatively, the container may be formed without a rim.

The lid 14 comprises a top wall 24 and a sidewall 26 that encompasses and projects downwardly and outwardly from the top wall 24. The top wall 24 is desirably elevated with respect to the cooperating base 12 to accommodate the food products therein. The top wall 24 may include a central portion that is recessed relative to a remainder of the top wall to cooperate with the base (like base 12) of another container stacked atop the container 10. It is contemplated that the sidewall may project only downwardly from the top wall. The lid 14 further includes an optional rim 28 (see FIGS. 3 and 4) encompassing and extending upwardly and outwardly from the sidewall 26. It is contemplated that the optional rim may only project outwardly from the sidewall. If an optional rim is formed on the lid, it is desirable that it corresponds with an optional rim formed on the base.

The lid 14 further comprises a plurality of ventable areas 30 formed therein. The plurality of ventable areas 30 is shown in FIGS. 1 and 2 as being located in the generally corner of the lid 14 on a top wall 24 thereof. The plurality of ventable areas 30 enables a user, if desired, to vent steam, pressure and/or heat caused by food 32 located in the container 10 as shown in FIGS. 3 and 4. The plurality of ventable areas 30 stays closed, keeping in steam, pressure and heat until the user decides that the ventable areas should be opened to vent any steam, pressure and/or heat contained therein. Additionally, the plurality of ventable areas, when closed, functions as a protective barrier or wall to prevent or inhibit dust or other particles from entering the container 10.

The plurality of ventable areas 30 does not open automatically once the internal pressure reaches a certain point associated with the heating of foods. Thus, whether the contents of the container are vented is determined solely by the user. It is contemplated that the container may have at least one ventable area, which is formed in the lid. Thus, it is contemplated that the lid may form exactly one ventable area.

According to one embodiment, the plurality of ventable areas 30 of FIG. 2 has three sides 30a-c that are not continuous connected. The three sides 30a-c may be formed by a knife blade or sharpened section of tool steel that includes at least one score therein to assist in keeping the ventable area in a closed position. This is referred to herein as a perforated area. Because the at least one score is formed in one or more of the sides 30a-c, for example, the three sides 30a-c are not continuously connected. This is shown with score 30g in FIGS. 2 and 3. It is contemplated that each side 30a-c may have a plurality of scores formed therein.

The perforated areas may be moved to an open position by, for example, a hinge or crease upon a user asserting pressure thereon. For example, the user may push downwardly on the ventable area to assert pressure to move the ventable area to an open position. Alternatively, the user may grasp the ventable area and assert pressure to move the ventable area to an open position.

It is contemplated that the plurality of ventable areas may be formed with a knife cut. The knife cut may cut completely through the surface of the lid. In this embodiment, the plurality of ventable areas remains generally closed until the user asserts pressure thereon. Thus, in a closed position, the ventable areas retain a substantial amount, if not virtually all, of the steam, pressure and/or heat contained therein and, thus, does not vent until the user moves the ventable area to an open position by asserting pressure thereon. For example, the user may push downwardly on the ventable area to assert pressure to move the ventable area to an open position. Alternatively, the user may grasp the ventable area and assert pressure to move the ventable area to an open position.

It is contemplated that the knife cut may not extend completely through the surface of the lid. For example, the knife cut may extend at least 50% into the surface so as to allow a user to move the ventable area to an open position by asserting pressure thereon. The knife cut typically extends at least 75% or even 90% or 95% into the surface of the lid so as to allow a user to move the ventable area to an open position by asserting pressure thereon.

The area between ends 30d and 30e of respective sides 30a, 30c may form a hinge. The hinged area allows a respective one of the plurality of ventable areas 30 to pivot in a manner that allows the steam, pressure and/or heat to escape from the container 10. Alternatively, the area between ends 30d and 30e of respective sides 30a, 30c may form a crease. The crease assists in moving a respective one of the ventable areas to a vented position. It is contemplated that the plurality of ventable areas may be moved to an open position without using a hinge or crease. A crease, however, may form after opening the ventable area.

To vent the container according to one method, a user presses downwardly on the ventable area 30 as shown in FIG. 3, resulting in the ventable area 30 opening and venting steam, heat and/or pressure from the container 10 as shown in FIG. 4. Alternatively, a user may grasp the ventable area and assert pressure thereon to move the ventable area to an open position. The ventable area 20 after being moved to a vented position desirably remains with the remainder of the lid. It is contemplated that the ventable areas may be detached from the remainder of the lid during movement to the vented position.

The plurality of ventable areas may be located in different areas on the lid than depicted in FIGS. 1 and 2, including the sidewalls 26 of the lid 14 and other locations of the top wall 24 of the lid 14. It is desirable to locate the plurality of ventable areas near or in the top wall so as to assist in preventing or inhibiting any liquid juices of the food product from escaping the container 10. The liquid juices, if present, should remain in the container 10 as long as the container 10 is not substantially tilted towards any of the plurality of ventable areas 30. It is also contemplated that if a compartmented container is used, then at least one ventable area may be located over certain foods. Thus, if a certain food in one of the compartments is the only one to be vented, then the ventable area located nearest to this compartment is opened, while the remaining ones of the ventable areas remain closed.

At least one ventable area may be located on a relative flat surface such as top wall 24 to assist in preventing or inhibiting a scraping action similar to a shear key. This assists in forming a ventable area that will open on pressure from the user. This also assists in making the cut without having to push the material out of the way. At least one ventable area may also be formed on a slight angle (such as shown in FIG. 1) to allow improved venting when the containers are stacked upon each other. For example, this angle may be from 0 to about 45° and, more specifically, from about 10° to about 20° relative to a parallel plane of the top of the container.

The base and the lid may be formed with one of a variety of latching or closure mechanisms known to those skilled in the art. For example, the base and lid may be releasably latched by a latching mechanism described in U.S. Pat. No. 5,758,791. Releasably latched is defined herein as including snap engagements, firmly-held engagements and substantially leak-resistant engagements. It is contemplated that the container 10 of the present invention may be releasably latched by other known latching mechanisms, such as that described in U.S. Pat. No. 5,607,709. It is also contemplated that the base and the lid may be releasably latched by using undercuts. To assist a user in disengaging the lid 14 and the base 12, the lid and the base may include one or more tabs.

The plurality of ventable areas 30 of container 10 is shown as being generally finger shaped or U-shaped. It is contemplated that the at least one ventable area may be other shapes, such as a triangular shape, rectangular shape, other polygonal shapes or non-polygonal shapes. The veritable areas are desirably formed to be aesthetically pleasing to the user in both the open and closed positions.

According to one embodiment, the lid 14 of the container 10 is made from an alkenyl aromatic polymeric foam. The term "alkenyl aromatic polymer" as used herein includes polymers of aromatic hydrocarbon molecules that contain an aryl group joined to an olefinie group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, and vinyl toluene. Alkenyl aromatic polymers also include homopolymers of styrene (commonly referred to as polystyrene), copolymers of styrene and butadiene, and rubber-toughened polystyrene (commonly referred to as high impact polystyrene or HIPS). The alkenyl aromatic polymer may be an oriented polystyrene (OPS). The lid may be made from more than one alkenyl aromatic polymer.

The lid of the container may also be formed from foams comprising polyolefins such as polypropylene, polyesters such as polyethylene terephthalate (PET), and combinations thereof. The polymeric foam lid may be made from a mineral-filled polymeric material such as, for example, talc or calcium carbonate-filled polyolefin.

The base 12 of the container 10 may be made of the same materials described above in forming the lid 14. Specifically, the base 12 may be formed of alkenyl aromatic polymeric foams, polyolefins foams such as polypropylene, polyesters foams such as polyethylene terephthalate (PET), and combinations thereof. The base may be made from a mineral-filled polymeric material such as, for example, talc or calcium carbonate-filled polyolefin. It is also contemplated that the base may be formed of other non-foamed materials such as, for example, aluminum, paper and non-foamed polymeric materials, such as polyolefins and polyesters.

The containers of the present invention are typically disposable, but it is contemplated that they may be reused at a future time. It is contemplated that the containers may be formed of multiple compartments. Such containers are desirable for placing food items in different compartments to prevent or inhibit commingling of items. Undesirable mixing of food items can corrupt the flavor and the consistency of the food items. The thickness of the container generally ranges from about 30 to about 150 mils, but is typically from about 70 to about 100 mils.

A method of using such a container includes placing the food therein, venting the container by opening at least one ventable area such as shown in FIGS. 3 and 4. The container may then be placed in a heating apparatus, such as a microwave, to heat the food. The container may contain solid food products. The container may be used for storage in the refrigerator and/or the freezer.

The polymeric foam container may be formed using conventional thermoforming (e.g., by pressure, vacuum or the combination thereof). According to one method of thermoforming, polymeric pellets such as an alkenyl aromatic polymer resin and additives, if any, are added into an extruder. The pellets of the alkenyl aromatic polymeric resin and additives, if any, are melted to form a blend. The blend is extruded through a die to form an extruded foamed sheet. The extruded foamed sheet is thermoformed to a desired shape of a container.

According to this method, the container is made in a thermoforming mold. The mold includes a knife blade or sharpened section of tool material that is located to form the at least one ventable area. The knife blade may be serrated. The knife blade or sharpened section of tool material may be made of material such as steel. It is contemplated that other materials may be used in forming the knife blade or sharpened section of tool material. The at least one ventable area may be formed in a trimming step of the process.

The knife blade or sharpened section of tool material is positioned to form the desired shape of the ventable areas. To assist in allowing the ventable areas to remain closed until opened by the user, there may be at least one score in the knife or sharpened section of tool material to form a perforated cut. To maintain the sharpness of the knife or sharpened section of tool material, the contact area below it may have some cushion while still ensuring reliable contact. This contact area may be a striker plate that assists in aligning the knife blade or sharpened section of tool material to assist in properly locating the at least one veritable area. To assist in replacing of worn or spent tooling, the striker plate and the knife blade or sharpened section of tool material are often made of materials with different hardness. For example, the striker plate may be made of a harder material than the knife blade or sharpened section of tool material such that the knife blade or sharpened section of tool material will be replaced more often than the striker plate.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:
1. A ventable container, comprising:
a base including,
 a bottom wall, and
 a base sidewall extending upwardly from the bottom wall to define a volume of the base, wherein the base further includes a base rim extending from the base sidewall opposite the bottom wall; and a lid releasably engageable with the base, wherein the lid and the base are movable relative each other between an open position and a closed position, wherein the base rim provides support for the lid in the closed position, the lid including, a top wall having a flat central region, a lid sidewall extending downwardly from the top wall at a first angle with respect to the central region of the top wall, a lid rim extending from the lid sidewall opposite the top wall, and at least one selectively ventable area located between the central region of the top wall and the lid side wall, the at least one selectively ventable area being movable between a closed condition and an open condition by exertion of an external force imposed upon the at least one selectively ventable area, the at least one selectively ventable area being disposed at a second angle with respect to the central region of the top wall to permit ventilation via the at least one selectively ventable area when a substantially identical ventable container is stacked on the top wall, the second angle being different than the first angle.

2. The ventable container according to claim 1, wherein the at least one ventable area is defined by at least a first score and a second score spaced apart from the first score.

3. The ventable container according to claim 2, wherein the first score and the second score together form a general U-shape.

4. The ventable container according to claim 3, wherein the at least one ventable area includes a hinge, wherein the at least one selectively ventable area is detachable about the hinge.

5. The ventable container according to claim 4, wherein the hinge is disposed on the at least one ventable area opposite the sidewall.

6. The ventable container according to claim 2, wherein the first score and the second score define a perforation.

7. The ventable container according to claim 1, wherein the top wall of the lid is substantially rectangular and the at least one ventable area is disposed proximate a corner of the top wall.

8. The ventable container according to claim 1, wherein the lid rim projects laterally outward from the lid sidewall and is releasably latched with the base rim.

9. The ventable container according to claim 1, wherein the lid is coupled to the base along a portion of the base by a hinge.

10. The ventable container of claim 1, wherein at least one of the base and the lid is made of a polymer foam.

11. The venatable container according to claim 10, wherein the polymer foam is selected from at least one of alkenyl aromatic polymeric foam, polyolefin foam, polystyrene foam, and polyester foam.

12. The ventable container of claim 1, wherein the base and the lid are made of the same material.

13. The veritable container of claim 1, wherein the veritable container has a thickness of from about 30 to about 150 mils.

14. A plurality of substantially identical ventable containers, each ventable container comprising:
a base including,
a bottom wall, and
a base sidewall extending upwardly from the bottom wall to define a volume of the base, wherein the base further includes a base rim extending from the base sidewall opposite the bottom wall; and a lid releasably engageable with the base, wherein the lid and the base are movable relative each other between an open position and a closed position, wherein the base rim provides support for the lid in the closed position, the lid including, a top wall having a flat central region, a lid sidewall extending downwardly from the top wall at a first angle with respect to the central region of the top wall, a lid rim extending from the lid sidewall opposite the top wall, and at least one selectively ventable area located between the central region of the top wall and the lid side wall, the at least one selectively ventable area being movable between a closed condition and an open condition by exertion of an external force imposed upon the at least one selectively ventable area, the at least one selectively ventable area being disposed at a second angle with respect to the central region of the top wall to permit ventilation via the at least one selectively veritable area when one of the plurality of ventable containers and another one of the plurality of ventable container are stacked one on another, the second angle being different than the first angle.

15. The plurality of substantially identical ventable containers according to claim 14, wherein the at least one ventable area is defined by at least a first score and a second score spaced apart from the first score.

16. The plurality of substantially identical ventable containers according to claim 15, wherein the first score and the second score together form a general U-shape.

17. The plurality of substantially identical ventable containers according to claim 16, wherein the at least one ventable area includes a hinge, wherein the at least one selectively ventable area is detachable about the hinge.

18. A ventable container, comprising:
a base; and
a lid releasably engageable with the base, wherein the lid and the base are movable relative each other between an open position and a closed position, the lid including,
a top wall having a flat central region,
a lid sidewall extending downwardly from the top wall at a first angle with respect to the central region of the top wall, and
at least one selectively ventable area located between the central region of the top wall and the lid side wall, wherein the at least one selectively ventable area is defined by at least one score, the at least one selectively ventable area being movable between a closed condition and an open condition by exertion of an external force imposed upon the at least one selectively ventable area, the at least one selectively ventable area being disposed at a second angle with respect to the central region of the top wall to permit ventilation via the at least one selectively ventable area when a substantially identical ventable container is stacked on the top wall, the second angle being different than the first angle.

19. The ventable container according to claim 18, wherein the at least one ventable area includes a surface disposed between the top wall and the lid sidewall, the surface being disposed at the second angle with respect to the central region of the top wall.

20. The ventable container according to claim 1, wherein the at least one ventable area includes a surface disposed between the top wall and the lid sidewall, the surface being disposed at the second angle with respect to the central region of the top wall.

21. The ventable container according to claim 14, wherein the at least one veritable area includes a surface disposed between the top wall and the lid sidewall, the surface being disposed at the second angle with respect to the central region of the top wall.

22. The ventable container according to claim 18, wherein the base includes a bottom wall, and a base sidewall extending upwardly from the bottom wall to define a volume of the base, wherein the base further includes a base rim extending from the base sidewall opposite the bottom wall to provide support for the lid in the closed position.

23. The ventable container according to claim 18, wherein the at least one score is defined by at least a first score and a second score spaced apart from the first score.

* * * * *